United States Patent

Rayner

[15] 3,680,812

[45] Aug. 1, 1972

[54] TAPE RECORDER

[72] Inventor: Wilfred H. G. Rayner, London, England

[73] Assignee: Clarke and Smith Manufacturing Company Limited

[22] Filed: April 9, 1917

[21] Appl. No.: 26,815

[30] Foreign Application Priority Data

April 11, 1969 Great Britain............18,763/69

[52] U.S. Cl. ....................242/199, 33/138, 352/172

[51] Int. Cl......G03b 1/04, G11b 15/32, G11b 23/04

[58] Field of Search............242/67.3, 179, 197–200, 242/208–210; 33/137, 138–140, 128, 129, 134 R; 352/170–172

[56] References Cited

UNITED STATES PATENTS

| | | | |
|---|---|---|---|
| 3,152,332 | 10/1964 | Miyauchi | 352/172 |
| 2,943,804 | 7/1960 | Loewe et al. | 242/186 |
| 2,944,750 | 7/1960 | Hall, Jr. | 242/206 |
| 3,450,361 | 6/1969 | Sohn | 242/206 |
| 2,756,279 | 7/1956 | Lang | 179/100.2 |
| 2,757,456 | 8/1956 | Handa | 33/129 |

*Primary Examiner*—Leonard D. Christian
*Attorney*—Lawrence E. Laubscher

[57] ABSTRACT

A tape recorder for receiving tape wound on spools having spokes and contained in a cassette is provided with a tape position indicator driven by a mechanism which is mounted on the underside of the tape deck and includes a rotatable sprocket wheel having teeth which project through a slot in the tape deck to engage the spokes of one of the spools for rotation of the sprocket wheel by the spool and a pulley-and-belt arrangement for driving the tape-position indicator in dependence upon the rotation of the sprocket wheel. The sprocket wheel is resiliently mounted so that it may be moved against a resilient bias to retract the teeth from the slot.

8 Claims, 3 Drawing Figures

WILFRED H. G. RAYNER
INVENTOR

BY

Lawrence B. Laubscher
ATTORNEY

WILFRED H. G. RAYNER

INVENTOR

BY

Lawrence E. Laubscher

ATTORNEY

TAPE RECORDER

BACKGROUND OF THE INVENTION

The present invention relates to a tape recorder and more particularly to a drive mechanism for the tape position indicator of the tape recorder.

In this specification the term "tape recorder" is intended to include both an apparatus which may be used to make a record upon a tape and an apparatus which may be used to reproduce any such record instead of or in addition to being usable to make any such record.

DESCRIPTION OF PRIOR ART

Tape recorders are known in which the tape is wound on one or more spools and is driven through a drive wheel (which may be one of a pair where the tape is wound on two spools) to wind the tape in one direction or the other. One problem which arises in such a tape recorder is that the drive wheels may slip relative to the spools, and any tape position indicator coupled to the drive wheels would be liable to give an inaccurate reading.

The object of the present invention is to provide a drive mechanism for the tape-position indicator of a tape recorder which enables the tape position indicator to at all times accurately indicate the position of the tape.

SUMMARY OF THE INVENTION

The present invention provides a drive mechanism which comprises a rotatable sprocket wheel having teeth engageable with spokes of a tape spool for rotation of the sprocket wheel by the tape spool and a drive coupling mechanism for driving the tape position indicator in response to rotation of the sprocket wheel.

DESCRIPTION OF THE PREFERRED EMBODIMENT

Figure 1:
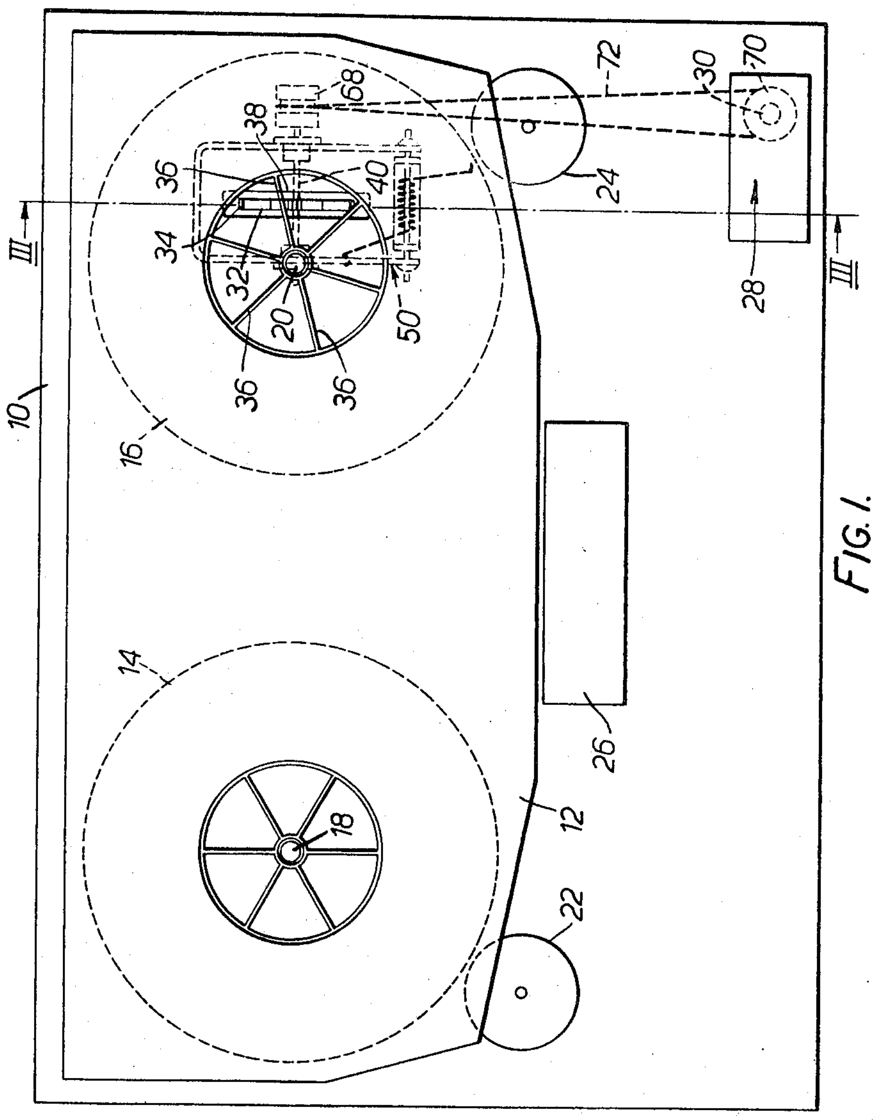
FIG. 1 is a simplified plan view of the tape-deck of the tape recorder, showing in outline the drive mechanism of the tape-position indicator.
Figures 2, 3:
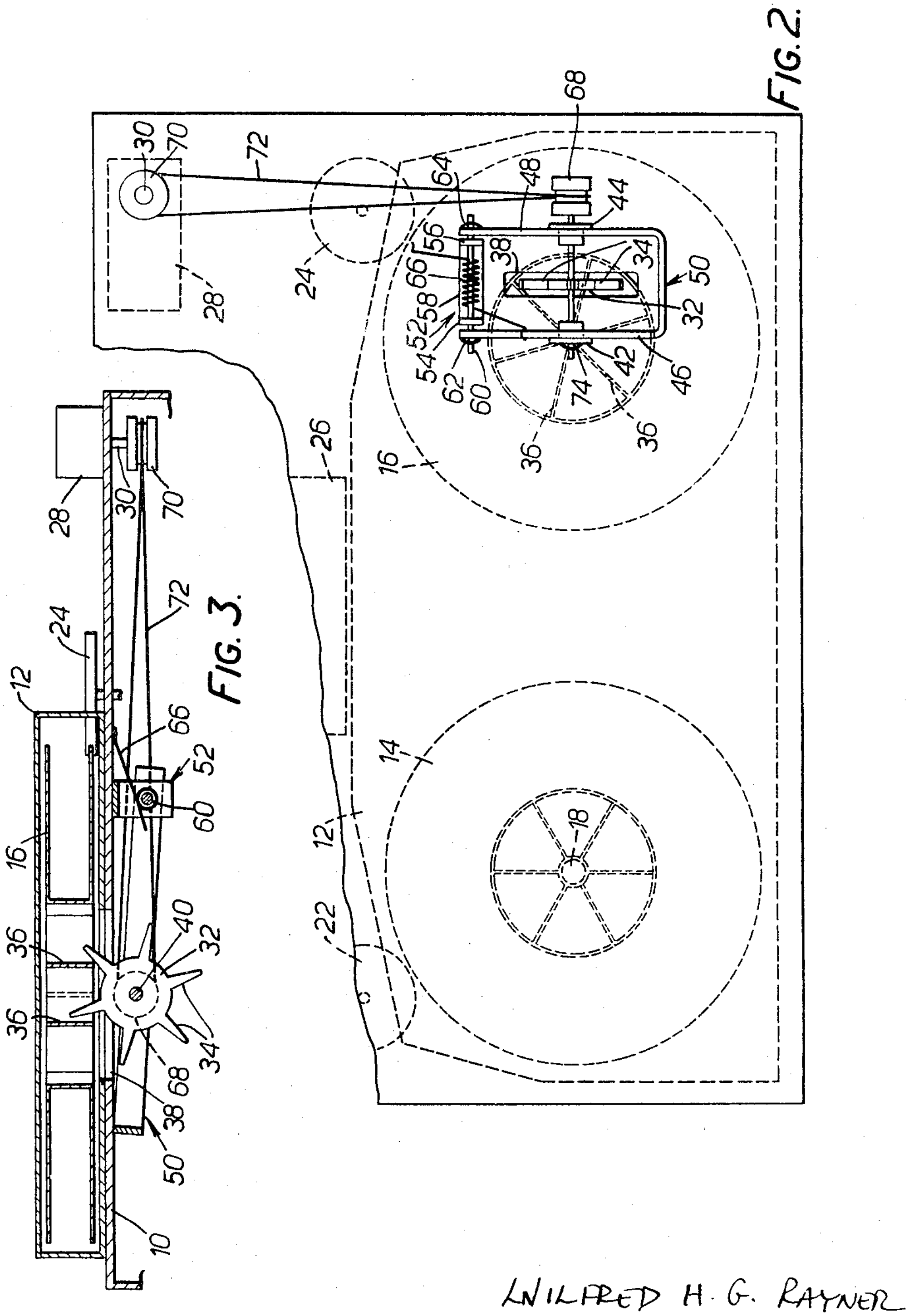
FIG. 2 is a view of the underneath side of the tape-deck of the tape recorder shown in FIG. 1, showing the drive mechanism in greater detail.
FIG. 3 is a section on the line III—III of FIG. 1

Referring to the drawings there is shown a tape recorder which includes a tape-deck 10 for receiving on its upper surface a cassette 12 containing two tape-spool 14, 16 which are rotatable on respective spindles 18, 20. Tape-driving apparatus is mounted below tape-deck 10 for driving the spools to wind the tape (not shown) in a forward direction from one spool to the other during recording or playback, or in a reverse direction from the other spool to the one spool during rewinding. This apparatus is not shown in full but includes two drive wheels 22, 24, one or the other being moved into driving engagement with the rim of its adjacent spool to wind the tape in one direction or the other. The usual slow and fast forward and fast reverse speeds are provided. A transducer head 26 (not shown in detail) is situated on tape-deck 10, and includes recording and playback transducers.

A tape-position indicator 28 is affixed to tape-deck 10 to provide an indication at any instant of the portion of the tape adjacent transducer head 26 at that instant. Indicator 28 may be a counter, giving a numerical indication, and is driven by rotation of a shaft 30, which is rotated by a drive mechanism which will now be described.

The drive mechanism for the indicator 26 includes a nylon sprocket wheel 32 rotatable about an axis perpendicular to and intersecting the axis of rotation of spool 16. The teeth 34 of sprocket wheel 32 are able to engage the spokes 36 of spool 16, so that sprocket wheel 32 may rotate in accordance with the rotation of spool 16. A slot 38 is provided in the tape-deck 10 and a corresponding slot is provided in the lower side of cassette 12 to align with slot 38 when cassette 12 is positioned on tape-deck 10. The slots provide access for teeth 34 of sprocket wheel 32 to spokes 36 of spool 16.

Sprocket wheel 32 is secured to an axle 40 which is journalled in bearings 42, 44 located in the opposite limbs 46, 48 of a U-shaped frame member 50. A U-shaped mounting member 52, having limbs 54, 56 and an interconnecting base portion 58, is bolted at its base portion 58 to the underneath side of tape-deck 10, with its limbs 54, 56 projecting downwardly. A pin 60 passes freely through bores in limbs 46, 48 of frame member 50 and through bores in limbs 54, 56 of mounting member 52 to pivot frame member 50 to the underneath side of tape-deck 10. Spring washers 62, 64 are mounted on the ends of pin 60, bearing resiliently against pin 60, to prevent accidental removal of pin 60. A coil spring 66 is positioned around pin 60 and has one end bearing against limb 46 of frame member 50 and its other end bearing against the underneath side of tape-deck 10 to urge frame member 50 in such a direction of rotation about pin 60 that sprocket wheel 32 is urged upwardly in its plane of rotation so that teeth 34 of sprocket wheel 32 are urged into engagement with spokes 36 of spool 16. Rotation of frame member 50 in this direction is limited by frame member 50 abutting the underneath side of tape-deck 10.

Pulley wheels 68, 70 are fixed to one end of shaft 40 and to the lower end of shaft 30, respectively, and a continuous belt 72 runs in grooves in pulley wheels 68, 70. A spring washer 74 affixed to the end of axle 40 opposite pulley wheel 68 and bearing resiliently against shaft 40 prevents axial movement of axle 40 and sprocket wheel 32.

In operation, spool 16 rotates and causes sprocket wheel 32 to rotate, thus rotating axle 40 and pulley wheel 68. Pulley wheel 68 drives belt 72 to drive pulley wheel 70 and hence rotate shaft 30 to drive indicator 28.

The resilient mounting of sprocket wheel 32 enables the sprocket wheel to be depressed while cassette 12 is being mounted on tape-deck 10 in the event that the lower side of cassette 12 surrounding the slot therein bears upon the upwardly-extending teeth 34. Thus the positioning of cassette 12 on tape-deck 10 is simplified and damage to teeth 34 is prevented. Moreover, a cassette devoid of a slot in its lower side may be used on the tape-recorder, the lower side causing sprocket wheel 32 to remain depressed once the cassette is positioned, although of course the indicator does not then operate.

I claim:

1. A tape recorder, comprising
a. a tape deck (10) for supporting on one side tape wound on at least one spool having spokes, said tape deck containing a slot (38) arranged adjacent said spool;
b. tape position indicator means (28) for indicating the position of said tape; and
c. drive coupling means for driving said tape position indicator means in response to movement of said spool, said drive coupling means including
1. a sprocket wheel (32) having a plurality of sprocket teeth (34);
2. sprocket wheel mounting means (50) connecting said sprocket wheel with said tape deck for movement on the opposite side thereof from said spool between a retracted position relative to said spool and an engaged position in which the sprocket teeth project through said slot for engagement with said spokes; and
3. means (66) resiliently biasing said sprocket wheel toward said engaged position, whereby the sprocket wheel is movable against said biasing means to retract said teeth from said spokes.

2. Apparatus as defined in claim 1, wherein said sprocket wheel mounting means comprises
a frame member (50);
axle means (40) rotatably connecting said sprocket wheel with said frame member;
and pivot pin means (60) connecting said frame member with said tape deck for pivotal movement about an axis parallel with said axle, said resilient means being operable to pivotally bias said frame member about said pivot axis in the direction of said slot.

3. A tape recorder, comprising
a. a tape deck for supporting on one side tape wound on at least one spool having spokes, said tape deck containing a slot arranged adjacent said spool;
b. tape position indicator means for indicating the position of said tape, said indicator means including a drive shaft; and
c. drive coupling means for driving said tape position indicator means in response to movement of said spool, said drive coupling means including
1. a sprocket wheel (32) having a plurality of sprocket teeth;
2. sprocket wheel mounting means connecting said sprocket wheel with said tape deck on the opposite side thereof from said spool in a position in which the sprocket teeth project through said slot for engagement with said spokes;
3. first and second pulleys connected with said sprocket wheel and with said indicator drive shaft, respectively; and
4. a continuous driving belt connecting said first pulley with said second pulley.

4. A tape recorder, comprising
a. a tape deck for supporting on one side tape wound on at least one spool having spokes, said tape deck containing a slot adjacent said spool;
b. tape position indicator means for indicating the position of said tape, said indicator means comprising a counter for providing a numerical indication of the position of the tape; and
c. drive coupling means for driving said tape position indicator means in response to movement of said spool, said drive coupling means including
1. a sprocket wheel having a plurality of sprocket teeth; and
2. sprocket wheel mounting means connecting said sprocket wheel with said tape deck on the opposite side thereof from said spool with the sprocket teeth extending through said slot for engagement with said spokes.

5. Apparatus as defined in claim 4, wherein said tape and said spool are contained in a cassette that contains a slot opposite said spool, said tape deck being adapted to support said cassette in a position in which the slot thereof is opposite the tape deck slot and the spokes of said spool are arranged for engagement by the sprocket teeth.

6. Apparatus as defined in claim 5, and further including tape drive means for winding the tape within said cassette, said tape drive means including a drive wheel engagable with the rim portion of said spool.

7. A tape recorder, comprising
a. a horizontal tape deck for supporting on its upper side tape wound on at least one spool having radial spokes, said tape deck containing a slot adjacent said spool;
b. tape position indicator means mounted on said tape deck for indicating the position of said tape;
c. a sprocket wheel having on its outer periphery a plurality of sprocket teeth;
d. means mounting said sprocket wheel beneath said tape deck with the sprocket axis generally parallel with said tape deck and with said sprocket teeth extending through said slot for engagement with said spokes; and
e. means connecting said sprocket wheel with said tape position indicator means to operatively drive the same in response to movement of said spool.

8. A tape recorder, comprising
a. a tape deck (10);
b. spindle means (20) on said tape deck for rotatably supporting a tape spool having radial spokes;
c. tape position indicator means (28) for indicating the position of said tape; and
d. drive coupling means for driving said tape position indicator means in response to movement of said spool, said drive coupling means including
1. a sprocket wheel (32) having a plurality of sprocket teeth (34);
2. means (50) rotatably connecting said sprocket wheel with said tape deck for rotation about an axis that is angularly arranged relative to the axis of said spindle means and at a location at which the sprocket teeth engage said radial spokes; and
3. means connecting said sprocket wheel with said tape position indicator means.

* * * * *